Patented Feb. 16, 1926.

1,572,944

UNITED STATES PATENT OFFICE.

MARTIN F. NEWMAN, OF OAKMONT, PENNSYLVANIA, ASSIGNOR TO WM. B. SCAIFE & SONS COMPANY, OF OAKMONT, PENNSYLVANIA, A CORPORATION OF PENNSYLVANIA.

PROCESS OF SOFTENING WATER.

No Drawing. Application filed April 19, 1924. Serial No. 707,770.

*To all whom it may concern:*

Be it known that I, MARTIN F. NEWMAN, a citizen of the United States, and a resident of Oakmont, in the county of Allegheny and State of Pennsylvania, have invented a new and useful Improvement in Processes of Softening Water, of which the following is a specification.

This invention relates to the preparation of feed water for boilers.

Among the objects of the invention is the provision of a feed water in which hardness and alkalinity have been reduced to a minimum by precipitation treatment. An object is to thereafter further reduce the alkalinity by the addition of a special non-precipitate forming reagent. Another object is to increase the solubility of the residual calcium, i. e. calcium remaining after the precipitation treatment, by the addition of a special non-precipitate forming reagent.

More generally stated the object of the invention is to treat feet water by reagents, used in such order and series as to secure the lowest practicable alkalinity from the amount of reagents used, and to leave in the water reagents adapted to further increase the solubility of residual calcium and to prevent the hydrolysis of sodium carbonate under the conditions of temperature, pressure, and concentration existing inside the boiler.

As is well known in this art, many waters are unsuitable for use in boilers because they contain soluble substances which will be precipitated under conditions existing inside of a steam boiler. The ultimate effect from such substances is the formation of scale, clogging up the tubes, lower thermal conductivity, and other objectionable factors related to steam generation. For example, waters that are high in lime, magnesia or iron, so-called hard waters, must ordinarily be treated to reduce the hardness before they are used as feed waters. This treatment usually comprises the precipitation of the lime, magnesia or iron and subsequent filtration, or else softening by the use of zeolites in well known manner.

In order to secure the most complete precipitation of calcium, magnesium, etc., in these first treatments, a certain degree of alkalinity must be maintained. Consequently during this preliminary precipitation treatment it is not practicable to either lower the alkalinity or increase the solubility of calcium, for such treatment would prevent obtaining the maximum softening effect from treatment for precipitation.

The addition of certain chemicals to a feed water will tend to lower the alkalinity thereof, and to increase the solubility of calcium contained therein, and therefore these reagents are advantageous additions to feed water. Even though a feed water is of comparatively low alkalinity and hardness when introduced into a boiler, the alkalinity is gradually increased as the water evaporates, and as this increases the tendency to precipitate hardening substances contained therein is increased. Consequently the presence in the feed water in the boiler of elements that will tend to reduce the alkalinity, and at the same time also tend to raise the solubility of the residual calcium will be advantageous in counteracting the effect of the concentration that occurs in the boiler to prevent the formation of scale and to minimize the hydrolysis of sodium carbonate. Furthermore the reagents which have been found to increase the solubility of residual calcium and to retard the hydrolysis of soduim carbonate inside the boiler can be simultaneously introduced after the maximum softening has been accomplished.

My invention consists in treating raw feed water for the purpose above referred to and in a particular order.

The completeness with which calcium, magnesium, etc., and similar hardening agents are precipitated in a softening process depends upon the alkalinity produced by the reagents added for the purpose of causing precipitation of such elements. Anything that tends therefore to lower alkalinity or to raise solubility of the hardening elements during this treatment, prevents the production of a resultant water of minimum hardness. Consequently in my process I first complete the treatment of the feed water with a standard precipitation process using lime and soda ash or other reagents.

After the precipitation of calcium and magnesium has been completed by the lime and soda ash treatment or other precipitative reagents to reach a minimum hardness with a relatively low alkalinity, I then add to this treated water an acid sulphate, such for example as sodium bisulphate, ammonium bisulphate, or potassium bisulphate, or commercial materials containing acid sulphates, such for example as nitre cake or salt cake. This has the effect of further reducing the alkalinity without precipitation. I then add a reagent such as tannic acid, disodium phosphate or the like. These reagents have the function of changing residual calcium carbonate, etc., to the more soluble phosphate, tannate, etc. The addition of either of these groups of reagents during the preliminary lime and soda ash treatment would have partially prevented the object of the treatment, but their addition to a water which has already been reduced to a minimum alkalinity and hardness so far as could be reduced by treatment for precipitation, results in a further reduction of the alkalinity, and the increased solubility of the residual hardening elements. Furthermore the sulphates added to decrease alkalinity tend to inhibit the hydrolysis of residual carbonate in the boiler. The elements such as tannic acid added to increase the solubility of residual calcium materially reduces the amount of precipitates that will be formed in a given time in the boiler, and so results in the greatest possible continuous operation of the boiler.

By this arrangement of treatments there is no neutralization of the treating reagents one with the other, and the functions of the various treating reagents are secured in maximum degree.

I claim:

1. The process of treating feed water for boilers, comprising the steps of first with suitable reagents neutralizing acids and precipitating hardening substances, and thereafter adding to such a treated water an acid sulphate to reduce the alkalinity further.

2. The process of treating feed water for boilers, comprising the steps of first reducing the alkalinity of the raw water by suitable reagents, and thereafter adding to the treated water a further alkalinity-reducing reagent such as sodium bisulphate.

3. The process of treating feed water for boilers, comprising the steps of first reducing the alkalinity of the raw water by suitable reagents, and thereafter adding to the treated water a reagent for increasing the solubility of residual calcium such as tannic acid.

4. The process of treating feed water for boilers, comprising the steps of first reducing the alkalinity of the raw water by suitable reagents, and thereafter adding to the treated water an acid sulphate and a reagent for increasing the solubility of residual hardening elements.

5. The process of treating feed water for boilers, comprising the steps of first reducing the alkalinity of the raw water by suitable reagents, and thereafter adding to the treated water sodium bisulphate to further reduce alkalinity and tannic acid to increase solubility of the residual calcium.

In testimony whereof, I sign my name.

MARTIN F. NEWMAN.